(12) United States Patent
Takamoto et al.

(10) Patent No.: US 10,413,965 B2
(45) Date of Patent: *Sep. 17, 2019

(54) METHOD FOR PRODUCING FORGED CRANKSHAFT

(71) Applicant: NIPPON STEEL & SUMITOMO METAL CORPORATION, Tokyo (JP)

(72) Inventors: Sho Takamoto, Osaka (JP); Kenji Tamura, Takatsuki (JP); Tomohisa Yamashita, Suita (JP); Kunihiro Yabuno, Matsubara (JP); Ken Yoshino, Guangdong (CN); Hiroyuki Kurokawa, Nishinomiya (JP); Junichi Okubo, Amagasaki (JP); Koichiro Ishihara, Kyoto (JP)

(73) Assignee: NIPPON STEEL CORPORATION, Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 15/560,534

(22) PCT Filed: Mar. 31, 2016

(86) PCT No.: PCT/JP2016/060682
§ 371 (c)(1),
(2) Date: Sep. 22, 2017

(87) PCT Pub. No.: WO2016/159246
PCT Pub. Date: Oct. 6, 2016

(65) Prior Publication Data
US 2018/0111185 A1 Apr. 26, 2018

(30) Foreign Application Priority Data
Dec. 15, 2015 (JP) ................. 2015-243888

(51) Int. Cl.
*B21K 1/08* (2006.01)
*F16C 3/08* (2006.01)
(Continued)

(52) U.S. Cl.
CPC ................. *B21K 1/08* (2013.01); *B21J 5/027* (2013.01); *F16C 3/08* (2013.01); *F16C 2220/46* (2013.01); *F16F 15/26* (2013.01)

(58) Field of Classification Search
CPC ...... B21K 1/08; F16C 3/08; F16C 3/06; B21J 5/027; B21J 5/08; B21J 9/06; B21J 9/08; B21J 9/12; B23P 15/00; B23P 2700/07
See application file for complete search history.

(56) References Cited

U.S. PATENT DOCUMENTS 4,811,585 A * 3/1989 Takahashi ................ B21H 1/18
29/6.01
2015/0321245 A1* 11/2015 Tahira ..................... B21K 1/08
74/595

FOREIGN PATENT DOCUMENTS

CN 107000034 8/2017
EP 3 231 530 10/2017
(Continued)

*Primary Examiner* — Jun S Yoo
(74) *Attorney, Agent, or Firm* — Clark & Brody

(57) ABSTRACT

The disclosed production method includes a rough forging step of performing die forging to obtain a rough forged blank with flash having a crankshaft shape, and a finish forging step of applying die forging by use of a first pair of dies to the rough forged blank to obtain a finish forged blank with flash. In the rough forged blank, at least one of the rough crank arms have, in a region near an adjacent rough pin, a first excess portion protruding from an outer periphery of a side portion of the rough crank arm. During the die forging in the finish forging step, the first excess portion is deformed by the first pair of dies to bulge toward an adjacent rough journal.

20 Claims, 9 Drawing Sheets

(51) Int. Cl.
*B21J 5/02* (2006.01)
*F16F 15/26* (2006.01)

(56) References Cited

FOREIGN PATENT DOCUMENTS

| | | |
|---|---|---|
| JP | 2007-071227 | 3/2007 |
| JP | 2010-230027 | 10/2010 |
| JP | 2012-007726 | 1/2012 |
| JP | 2014-040856 | 3/2014 |
| JP | 2015-186815 | 10/2015 |
| WO | 2016/009620 | 1/2016 |

* cited by examiner

IID-IID

IVD-IVD

VC-VC

XC-XC

METHOD FOR PRODUCING FORGED CRANKSHAFT

TECHNICAL FIELD

The present invention relates to a method for producing a crankshaft by forging and more particularly to a method for producing a crankshaft by hot forging.

BACKGROUND ART

A reciprocating engine to be employed in a motor vehicle, a motorcycle, an agricultural machine, a marine vessel or the like requires a crankshaft to extract power by converting reciprocating motions of pistons to rotational motion. There are two types of crankshafts: the type manufactured by die forging and the type manufactured by casting. Especially when high strength and high stiffness are required, forged crankshafts manufactured by die forging are often employed.

A forged crankshaft is generally produced by using a billet as a starting material. The billet is circular or square in cross section, and the cross-sectional area is constant throughout the length. A method for producing a forged crankshaft includes a preforming step, a die forging step, and a trimming step that are to be executed in this order. After the trimming step, a coining step may be executed if needed. Typically, the preforming step includes a rolling step and a bending step, and the die forging step includes a rough forging step and a finish forging step.

FIGS. 1A to 1F are schematic diagrams showing a conventional method for producing a common forged crankshaft. A crankshaft 1 shown in FIG. 1F is a four-cylinder eight-counterweight crankshaft to be mounted in a four-cylinder engine. The crankshaft 1 includes five journals J1 to J5, four pins P1 to P4, a front part Fr, a flange Fl, and eight crank arms (hereinafter referred to simply as "arms") A1 to A8. The eight arms A1 to A8 connect the journals J1 to J5 respectively to the pins P1 to P4. All of the eight arms A1 to A8 have counterweights (hereinafter referred to simply as "weights") W1 to W8, which are integrated with the arms A1 to A8, respectively.

In the following paragraphs, when the journals J1 to J5, the pins P1 to P4, the arms A1 to A8, and the weights W1 to W8 are each collectively referred to, a reference character "J" is used for the journals, a reference character "P" for the pins, a reference character "A" for the arms, and a reference character "W" for the weights.

In the production method shown in FIGS. 1A to 1F, the forged crankshaft 1 is produced as follows. First, a billet 2 with a specified length as shown in FIG. 1A is heated in a heating furnace (for example, an induction heating furnace, a gas atmosphere heating furnace or the like), and the heated billet undergoes a rolling step. In the rolling step, the billet 2 is rolled and reduced, for example, by grooved rolls. This is to distribute the volume of the billet 2 in the axial direction, and thereby, a rolled blank 3, which is an in-process material, is obtained (see FIG. 1B). Next, in a bending step, the rolled blank 3 is partly reduced from a direction perpendicular to the length direction. This is to distribute the volume of the rolled blank 3, and thereby, a bent blank 4, which is a next in-process material, is obtained (see FIG. 1C).

Next, in a rough forging step, the bent blank 4 is reduced by a pair of an upper die and a lower die, and thereby, a rough forged blank 5 is obtained (see FIG. 1D). The rough forged blank 5 is roughly in the shape of a crankshaft (finished product). In a finish forging step, the rough forged blank 5 is reduced by a pair of an upper die and a lower die, and thereby, a finish forged blank 6 is obtained (see FIG. 1E). The finish forged blank 6 has a shape in agreement with the shape of the finished product, that is, the crankshaft.

During the rough forging and the finish forging, excess material flows out through a space between the mutually facing parting faces of the dies, which results in formation of flash. Accordingly, the rough forged blank 5 and the finish forged blank 6 have great flash B on the periphery.

In a trimming step, for example, while the finish forged blank 6 is nipped and held by a pair of dies, the finish forged blank 6 is punched by a cutting die. Thereby, the flash B is removed from the finish forged blank 6, and a forged blank with no flash is obtained. The forged blank with no flash has substantially the same shape as the forged crankshaft 1 shown in FIG. 1F.

In a coining step, main parts of the forged blank with no flash are slightly pressed by dies from above and below so that the forged blank with no flash can have the exact size and shape of the finished product. The main parts of the forged blank with no flash are, for example, shaft parts such as the journals J, the pins P, the front part Fr, the flange Fl and the like, and further, the arms A and the weights W. In this way, the forged crankshaft 1 is produced.

The production method shown in FIGS. 1A to 1F is applicable not only to production of a four-cylinder eight-counterweight crankshaft as shown in FIG. 1F but also to production of any other crankshaft. For example, the production method is applicable to a four-cylinder four-counterweight crankshaft.

In a four-cylinder four-counterweight crankshaft, only some of the eight arms A1 to A8 incorporate a weight W. For example, the front first arm A1, the rearmost eighth arm A8 and the central two arms (the fourth arm A4 and the fifth arm A5) incorporate a weight W. The other arms, namely, the second, the third, the sixth and the seventh arms A2, A3, A6 and A7 do not have a weight. Such arms without a weight will hereinafter referred to as "unweighted arms". These unweighted arms are oval.

Other crankshafts, for example, crankshafts to be mounted in three-cylinder engines, in-line six-cylinder engines, V-type six-cylinder engines, eight-cylinder engines and others can be produced by the same production method. It is noted that, when adjustment of the placement angles of the pins is necessary, a twisting step is added after the trimming step.

In recent years, there has been a need for weight reduction of reciprocating engines, particularly those for motor vehicles, in order to improve the fuel economy. Accordingly, there is also an ever-increasing demand for weight reduction of crankshafts to be mounted in reciprocating engines. Techniques to reduce the weight of a crankshaft are disclosed in Japanese Patent Application Publication No. 2012-7726 (Patent Literature 1) and Japanese Patent Application Publication No. 2010-230027 (Patent Literature 2).

Patent Literatures 1 and 2 teach an arm having a hole made in the journal-facing surface and teach a method for producing a crankshaft with the arm. The hole of the arm is made to lie on a straight line connecting the axis of the journal and the axis of the pin (which will be hereinafter referred to as an "arm centerline"), and the hole extends large and deep toward the pin. This arm is reduced in weight by the weight corresponding to the volume of the hole. The weight reduction of the arm leads to a weight reduction of the weight paired with the arm, thereby resulting in a reduction in weight of the whole forged crankshaft. Regarding the arm having a hole, in a region near the pin, both side portions across the arm centerline are thick, which ensures stiffness (torsional stiffness and bending stiffness).

Forming a recessed portion in the journal-facing surface of the arm while keeping both side portions of the arm thick as described above leads to weight reduction and ensuring of stiffness.

It is, however, difficult to produce such a forged crankshaft with such uniquely shaped arms by a conventional production method. The reason is as follows. When a recess is to be formed in the surface of an arm in the die forging step, the draft of the die will become a reverse draft at the site of the recess, and therefore, the forged blank will not be able to be removed from the die.

To avoid such situations, in the production methods disclosed in Patent Literatures 1 and 2, the following process is carried out. In the die forging step, the arm is shaped to be small with no recess formed in the surface of the arm, and after the trimming step, a punch is pushed into the surface of the arm so that the imprint made by the punch forms a recess.

In the crankshaft shown in FIG. 1F, all of the arms A and the weights W integrated therewith have the same shape. Practically, however, the arms A and the weights W integrated therewith may be different from one another in shape as needed. Japanese Patent Application Publication No. 2007-71227 (Patent Literature 3) and Japanese Patent Application Publication No. 2014-40856 (Patent Literature 4) disclose techniques for this.

Patent Literature 3 discloses a four-cylinder eight-counterweight crankshaft including a flywheel disposed at an end. In the crankshaft, the arms incorporating a weight are different from one another in the thickness and the center of gravity of the arm and in the mass of the weight. Accordingly, it is possible to reduce the thicknesses of the arms that need to have only low stiffness while ensuring the minimum necessary stiffness to each of the arms, thereby resulting in a reduction in weight.

Patent Literature 4 discloses a crankshaft for a multicylinder engine, the crankshaft including a flywheel disposed at an end. In the crankshaft, an arm that is less distant from the flywheel has higher bending stiffness and higher torsional stiffness than an arm that is more distant from the flywheel. Also, it is preferred that the arms are different from one another in the bending stiffness and in the torsional stiffness. Accordingly, it is possible to attain a reduction in weight while suppressing flexural vibration and torsional vibration.

In a case where the arms incorporating a weight have different arm shapes and different weight shapes, what portion of the arm needs to have high stiffness differs from arm to arm, depending on the shape. Specifically, an arm may need to have high stiffness in the region near the pin, while another arm may need to have high stiffness in the region near the journal.

CITATION LIST

Patent Literature

Patent Literature 1: Japanese Patent Application Publication No. 2012-7726
Patent Literature 2: Japanese Patent Application Publication No. 2010-230027
Patent Literature 3: Japanese Patent Application Publication No. 2007-71227

Patent Literature 4: Japanese Patent Application Publication No. 2014-40856

SUMMARY OF INVENTION

Technical Problems

The production methods disclosed in Patent Literatures 1 and 2 make it possible to make a hole in the journal-facing surface of an arm while keeping both side portions of the arm thick. Accordingly, the production methods allow production of a forged crankshaft with a reduced weight and assured stiffness.

In the production methods, however, in making a hole, the surface of an arm is strongly punched and is deformed entirely, and a great force is necessary for the punching. Therefore, a special facility including a die for supplying a great force to a punch is required, and it is also necessary to give attention to the durability of the punch.

It is an object of the present invention to provide a method for producing a forged crankshaft with both a reduced weight and assured stiffness by a simple process.

Solution to Problems

A production method according to an embodiment of the present invention is a method for producing a forged crankshaft including journals serving as a center of rotation, pins decentered from the journals, and crank arms connecting the journals and the pins. The forged crankshaft further includes counterweights integrated with all or some of the crank arms. The method includes a rough forging step of performing die forging to obtain a rough forged blank with flash having a crankshaft shape, and a finish forging step of applying die forging by use of a first pair of dies to the rough forged blank to obtain a finish forged blank with flash. The rough forged blank includes rough journals, rough pins, rough crank arms, and rough counterweights, which correspond to the journals, the pins, the crank arms, and the counterweights of the forged crankshaft, respectively. At least one of the rough crank arms has, in the region adjacent rough pin, a first excess portion protruding from an outer periphery of a side portion of the rough crank arm. During the die forging in the finish forging step, the first excess portion is deformed by the first pair of dies to bulge toward an adjacent one of the rough journals.

Advantageous Effects of Invention

In the forged crankshaft production method according to the present invention, in the rough forging step, at least one of the rough crank arms is formed to have, in a region near an adjacent rough pin, an excess portion protruding from an outer periphery of a side of the rough crank arm. In the finish forging step, the excess portion is deformed by a pair of dies to bulge toward an adjacent rough journal. This allows formation of a recess in the journal-facing surface of the arm and an increase in the thickness of the side portion of the arm in the region near the adjacent pin. Accordingly, the forged crankshaft produced by this method has a reduced weight and assured stiffness. Since the excess portion is deformed by die forging in the finish forging step, the deformation can be carried out in a simple manner by use of an existing equipment.

DESCRIPTION OF EMBODIMENTS

Figure 1A:
FIG. 1A is a schematic diagram of a billet during a conventional process of producing a common forged crankshaft.
Figure 1B:
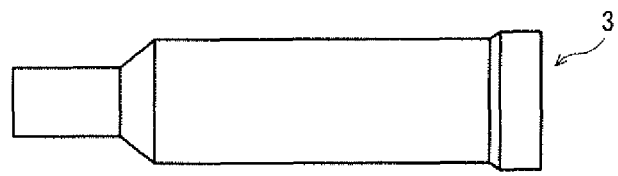
FIG. 1B is a schematic diagram of a rolled blank during the conventional process of producing a common forged crankshaft.
Figure 1C:
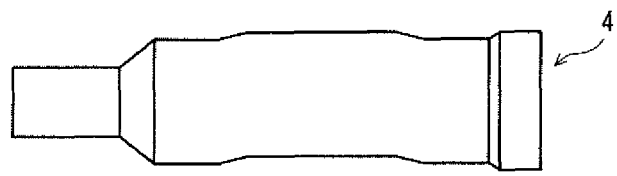
FIG. 1C is a schematic diagram of a bent blank during the conventional process of producing a common forged crankshaft.
Figure 1D:
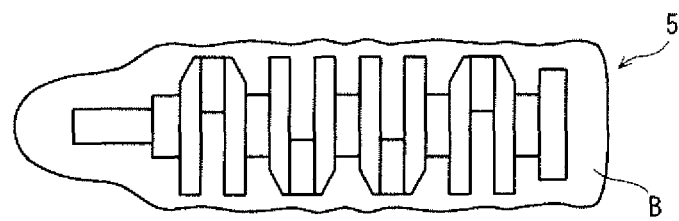
FIG. 1D is a schematic diagram of a rough forged blank during the conventional process of producing a common forged crankshaft.
Figure 1E:
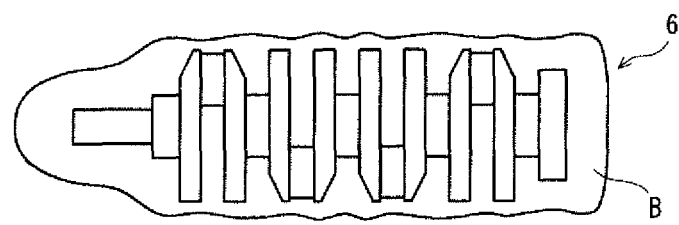
FIG. 1E is a schematic diagram of a finish forged blank during the conventional process of producing a common forged crankshaft.
Figure 1F:
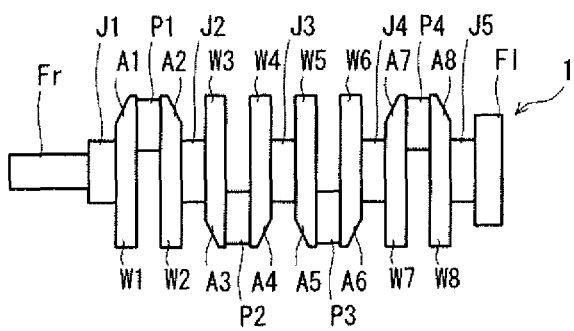
FIG. 1F is a schematic diagram of a crankshaft during the conventional process of producing a common forged crankshaft.

An embodiment of the present invention will hereinafter be described. However, the present invention is not limited to the embodiment to be described below.

(Forged Crankshaft Production Method)

A production method according to the present invention is a method for producing a forged crankshaft. The forged crankshaft includes journals serving as a center of rotation, pins decentered from the journals, and crank arms connecting the journals to the pins. The forged crankshaft further includes counterweights integrated with all or some of the crank arms.

The production method according to the present invention includes a rough forging step and a finish forging step to be executed in this order. The rough forging step is to obtain a rough forged blank with flash formed in a crankshaft shape by die forging. The rough forged blank has roughly the same shape as the crankshaft. The rough forged blank includes rough journals, rough pins, rough crank arms and rough counterweights corresponding to the journals, the pins, the crank arms and the counterweights of the forged crankshaft, respectively. The rough forged blank further includes flash and first excess portions which will be described later.

The finish forging step is to obtain a finish forged blank with flash by applying die forging to the rough forged blank by use of a first pair of dies (composed of a first upper die and a first lower die). At least one of the rough crank arms has, in the region adjacent rough pin, a first excess portion protruding from an outer periphery of a side portion of the rough crank arm. During the die forging in the finish forging step, the first excess portion is deformed by the first pair of dies to bulge toward the adjacent rough journal.

All of the rough crank arms may include a first excess portion. Alternatively, all or some of the rough crank arms incorporating a rough counterweight may include a first excess portion. Also, only the rough crank arms incorporating a rough counterweight may include a first excess portion. Also, all or some of the crank arms not incorporating a rough counterweight may include a first excess portion. Also, only the crank arms not incorporating a rough counterweight may include a first excess portion.

The rough crank arm has, in the region near an adjacent one of the rough pins, first excess portions respectively protruding from outer peripheries of two side portions of the rough crank arm. This structure ensures stiffness of both side portions of the crank arm in the region near the adjacent pin. Between the two first excess portions, an area As (area with a recess) is present. The surface of the recess may be convex and bulge in the center with respect to the width direction as will be described later.

In the finish forging step, the first excess portion of the rough crank arm may be deformed by the first pair of dies to bulge toward the rough journal while a second die is in contact with the rough-journal-facing surface of the rough crank arm at the portion between the first excess portion and the flash. This prevents deformation of the surface of the recess (the surface on the side toward which the first excess portion bulges), which will be described later. When the rough crank arm has, in the region near the adjacent rough pin, a first excess portion on only one of the two sides, the second die may be pressed against only the side in which the first excess portion is provided, bordered by the flash. When the rough crank arm has, in the region near the rough pin, two first excess portions protruding respectively from the two sides, a pair of dies may be used as the second die. When the rough crank arm has, in the region near the rough pin, two first excess portions protruding respectively from the two sides, alternatively, a two-pronged die may be used as the second die. When a pair of dies is used as the second die, the dies are placed to face each other across the flash and to contact the surface of the rough crank arm. In the finish forging step, for example, while the dies in the second pair face each other across the flash and contact the rough-journal-facing surface of the rough crank arm at the portions between the respective first excess portions and the flash, the first excess portions are deformed by the first pair of dies to bulge toward the rough journal. When the two-pronged die is used as the second die, the two edges of the die contact the surface of the rough crank arm while nipping the flash. Then, while the two-pronged die contacts the rough-journal-facing surface of the rough crank arm at the portions between the respective first excess portions and the flash, the first excess portions are deformed by the first pair of dies to bulge toward the rough journal.

In the finish forging step, the first excess portion may be deformed to bulge toward the rough journal while the flash is being held by a holder. Since the first excess portion is deformed by the first pair of dies, at the initial stage of the finish forging step, the shape of the first excess portion does not fit in the shape of the first pair of dies. Therefore, if the rough forged blank having a first excess portion before being deformed is held by only the lower first die, the rough forged blank will be in an unstable posture. This problem is noticeable especially when the first excess portion is provided to only one of the rough crank arms. By using the holder, it is possible to apply finish forging to the rough forged blank while keeping the rough forged blank in a stable posture. Specifically, finish forging can be performed with the flash of the rough forged blank kept in a horizontal posture. Further, the rough forged blank may be kept in the center between the upper die and the lower die by the holder.

The holder may move while keeping holding the lower surface of the flash along with movements of the first pair of dies. The flash may move up and down along with movements of the first pair of dies. In this case, it is preferred that the holder moves (up and down) following the flash.

Usually, a plurality of holders are used to hold the flash, and the lower surface of the flash is held at a plurality of portions. In the finish forging step, two or more (for example, three, four or more) holders may be used. Using four or more holders allows the rough forged blank to be kept in a more stable posture. The holders preferably hold the portions that are great in mass (for example, the portions around the rough counterweights). The plurality of holders may be located on different levels such that the rough forged blank at the start of finish forging is in a stable posture. For example, in producing a three-cylinder or six-cylinder crankshaft, the flash may not be formed on a level. In this case, the holders shall be placed on levels as appropriate according to the respective levels where the portions are to be kept.

The holders are moved to and kept in proper positions to serve the above function. There is no limit as to the mechanism for moving and keeping the holders, and any conventional mechanism can be used. For example, a hydraulic cylinder, an elastic member (spring) or the like can be used to move and keep the holders. The holders may be moved and kept by a conventional mechanism used for a knock-out pin. Alternatively, knock-out pins may be used as the holders.

In the finish forging step, the deformation of the first excess portion may be carried out by crushing or bending.

At least one of the rough crank arms has, in the region near the adjacent rough journal, a second excess portion protruding from an outer periphery of a side portion of the rough crank arm. In this case, during the die forging in the finish forging step, the second excess portion is deformed by the first pair of dies to bulge toward the adjacent rough pin. All of the rough crank arms may include a second excess portion. Alternatively, all or some of the rough crank arms incorporating a rough counterweight may include a second excess portion. Also, only the rough crank arms incorporating a rough counterweight may include a second excess portion. Also, all or some of the crank arms not incorporating a rough counterweight may include a second excess portion. Also, only the crank arms not incorporating a rough counterweight may include a second excess portion.

In the finish forging step, the second excess portion may be deformed to bulge toward the rough pin while a third die is in contact with the rough-pin-facing surface of the rough crank arm at the portion between the second excess portion and the flash. This keeps the rough forged blank in a stable position during the finish forging step. This also prevents deformation of the surface of the recess (the surface on the side toward which the second excess portion bulges), which will be described later. When the rough crank arm has, in the region near the adjacent rough journal, a second excess portion on only one of the two sides, the third die may be pressed against only the side in which the second excess portion is provided, bordered by the flash. When the rough crank arm has, in the region near the adjacent rough journal, two second excess portions protruding respectively from the two sides, a pair of dies may be used as the third die. When the rough crank arm has, in the region near the adjacent rough journal, two second excess portions protruding respectively from the two sides, alternatively, a two-pronged die may be used as the third die. When a pair of dies is used as the third die, the dies are placed to face each other across the flash and to contact the surface of the rough crank arm. In the finish forging step, for example, while the dies in the third pair face each other across the flash and contact the rough-pin-facing surface of the rough crank arm at the portions between the respective second excess portions and the flash, the second excess portions are deformed by the first pair of dies to bulge toward the adjacent rough journal. When a two-pronged die is used as the third die, the two edges of the die contact the surface of the rough crank arm while nipping the flash. Then, while the two-pronged die contacts the rough-pin-facing surface of the rough crank arm at the portions between the respective second excess portions and the flash, the second excess portions are deformed by the first pair of dies to bulge toward the rough pin.

At least one of the rough crank arms may has, in the region near the adjacent rough journal, two second excess portions protruding respectively from the outer peripheries of the two side portions of the crank arm. This structure ensures stiffness of both side portions of the crank arm in the region near the adjacent journal. Between the two second excess portions, an area At (area with a recess) is present. The surface of the recess may be convex and bulge in the center with respect to the width direction as will be described later.

The rough crank arms having at least one second excess portion may be the rough crank arms incorporating a rough counterweight.

The rough crank arms having at least one second excess portion may be the rough crank arms not incorporating a rough counterweight. In this case, the rough crank arms not incorporating a rough counterweight may have, in the region near the adjacent rough journal, second excess portions respectively protruding from the outer peripheries of both side portions.

In the finish forging step, the deformation of the second excess portion may be carried out by crushing or bending.

The second die, the third die and the holder may be used either alone or in any combination. For example, only the second die may be used, only the third die may be used, or only the holder may be used. Alternatively, the second die and the holder may be used in combination, the third die and the holder may be used in combination, the second die and the third die may be used in combination, or the second die, the third die and the holder may be used in combination.

The second die moves horizontally (in a direction perpendicular to the moving direction of the first pair of dies) to come into contact with the rough forged blank and nip the flash. The third die moves in the same way. When the rough forged blank is moved up and down in the finish forging step, the second die and the third die further moves along with the movement of the rough forged blank. Specifically, when the rough forged blank is moved down in the finish forging step, the second die and the third die move down along with the downward movement of the rough forged blank. There is no limit as to the mechanism for moving and keeping the second die and the third die, and any conventional mechanism can be used. Each of the second die and the third die may be provided with a horizontal movement mechanism and a mechanism for moving the horizontal movement mechanism vertically (in the up-down direction). For example, these mechanisms may employ a mechanism used in a double-acting pressing machine.

In an aspect, the present invention provides an exemplary method for producing a forged crankshaft. The exemplary production method is intended to produce a forged crankshaft including journals serving as a center of rotation, pins decentered from the journals, and crank arms connecting the journals to the pins. In the forged crankshaft, all or some of the crank arms incorporate a counterweight. The exemplary production method includes a rough forging step of performing die forging to obtain a rough forged blank with flash having a crankshaft shape, a finish forging step of applying die forging to the rough forged blank by use of a pair of dies to obtain a finish forged blank with flash. In the exemplary production method, in the rough forging step, first excess portions are formed such that at least one of the rough arms (rough crank arms) of the rough forged blank has, in a region near the adjacent pin (rough pin), first excess portions protruding respectively from outer peripheries of both side portions. Then, in the finish forging step, the first excess portions are deformed by the first pair of dies, whereby both side portions of each of these crank arms (rough crank arms) in the region near the adjacent pin (rough pin) are thickened.

The above paragraph describes a case where the rough forged blank necessarily includes first excess portions. However, the production method according to the present invention is applicable to a case where the rough forged blank does not include any first excess portions but include at least one second excess portion. In this case, as mentioned above, during the die forging in the finish forging step, the second excess portion is deformed by the first pair of dies to bulge toward the adjacent rough pin.

A forged crankshaft production method according an embodiment of the present invention will hereinafter be described with reference to the drawings. In the following paragraphs, descriptions of the matters already described with reference to FIGS. 1A to 1F may not be repeated.

1. Shape of Crankshaft

A forged crankshaft to be produced by a method according to the present embodiment includes journals serving as a center of rotation, pins decentered from the journals, and arms connecting the journals to the pins. All or some of the arms incorporate a weight.

In an aspect, the forged crankshaft to be produced by the method includes a number of units (which are also referred to as "slots") corresponding to the number of cylinders of the engine. One unit includes a pin, and two arms located to hold the pin therebetween. On both sides of one unit, two journals are located. Two adjacent units are connected to each other via a journal. In a crankshaft for a V-type six-cylinder engine, two pins and an arm therebetween define a small unit, and one small unit and two arms on both sides thereof define a large unit. Further, journals are located on both sides of the large unit.

The forged crankshaft production method according to the present embodiment is applicable to production of a four-cylinder eight-counterweight crankshaft and production of a four-cylinder four-counterweight crankshaft, for example. The forged crankshaft production method is applicable also to production of other types of crankshafts, such as crankshafts to be mounted in three-cylinder engines, in-line six-cylinder engines, V-type six-cylinder engines, eight-cylinder engines and others.

Figure 6A:
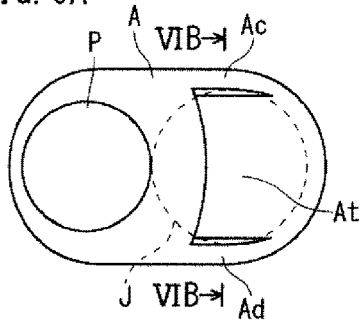
FIG. 6A is a diagram of an arm of a crankshaft having a third exemplary configuration according to the present invention, showing the pin-facing surface of the arm.
Figure 6B:
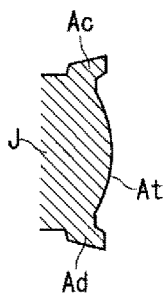
FIG. 6B is a sectional view along the line VIB-VIB in FIG. 6A.

More specifically, the forged crankshaft production method according to the present embodiment is applicable to production of a forged crankshaft having a first exemplary configuration as shown in FIGS. 2A to 2D, production of a forged crankshaft having a second exemplary configuration as shown in FIGS. 4A to 4D, and production of a forged crankshaft having a third exemplary configuration as shown in FIGS. 6A and 6B.

In either of the crankshafts having the first, the second and the third exemplary configurations, all of the arms, whether incorporating a weight or not, have a recess in the journal-facing surface. As will be described later, only some of the arms may have a recess in the journal-facing surface. In the crankshaft having the second exemplary configuration, the arms incorporating a weight further have a recess in the pin-facing surface. The crankshaft having the third exemplary configuration includes arms incorporating no weight. In the crankshaft having the third exemplary configuration, the arms incorporating no weight have a recess in the pin-facing surface in addition to the recess in the journal-facing surface.

According to the present embodiment, in order to form recesses in the arms, the crankshaft production method includes a rough forging step to obtain a rough forged blank, and a finish forging step to obtain a finish forged blank from the rough forged blank. The arms of the rough forged blank have first excess portions, and in the finish forging step, the first excess portions are deformed to bulge toward the journals. The shapes of the arms of the forged crankshaft (finished product) and of the rough forged blank will hereinafter be described.

Figure 2A:
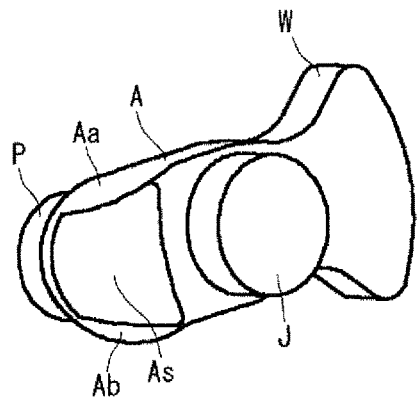
FIG. 2A is a perspective view of an arm of a crankshaft having a first exemplary configuration according to the present invention, schematically showing the journal-facing surface of the arm.
Figure 2B:
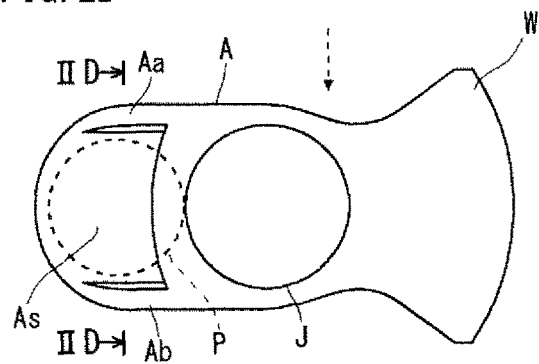
FIG. 2B is a diagram showing the journal-facing surface of the arm shown in FIG. 2A.
Figure 2C:
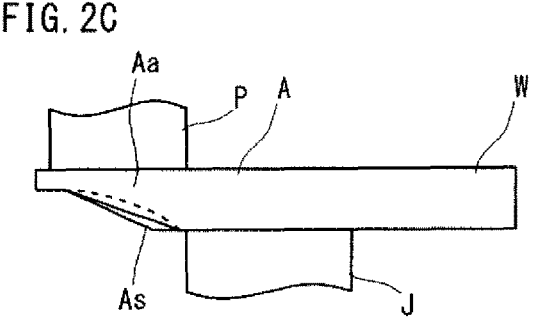
FIG. 2C is a diagram showing a side surface of the arm shown in FIG. 2A.
Figure 2D:
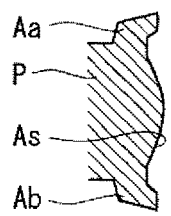
FIG. 2D is a sectional view along the line IID-IID in FIG. 2B.

FIGS. 2A to 2D are diagrams showing an arm of the crankshaft having the first exemplary configuration according to the present invention. FIG. 2A is a perspective view, FIG. 2B is a view showing the journal-facing surface, and FIG. 2C is a side view. FIG. 2D is a sectional view along the line IID-IID in FIG. 2B. FIGS. 2A to 2D show an arm of the finished crankshaft, and the shape is attained, for example, by applying trimming to the finish forged crankshaft. FIGS. 2A to 2D show an arm (incorporating a weight) that is extracted from the crankshaft to represent the arms of the crankshaft, and the other arms of the crankshaft are not shown. FIG. 2C is a view from the direction indicated by the dashed arrow in FIG. 2B.

As shown in FIGS. 2A to 2D, in the first exemplary configuration, each of the arms A has a recess in the journal(J)-facing surface, in a region near the adjacent pin P, in an area As inside of both side portions (two side portions) Aa and Ab. The side portions Aa and Ab in the region near the pin P bulge toward the journal J, and the thicknesses of the side portions (Aa, Ab) are greater than the thickness of the recess. The side portions mean surfaces and portions therearound at the edges of the arm A in the width direction (a direction perpendicular to the decentering direction of the pins), that is, the end portions of the arm A in the width direction. The area As is on the surface opposite to the pin P, that is, on the journal(J)-facing surface.

In the crankshaft having the first exemplary configuration, the side portions Aa and Ab of each arm A are kept as thick as an arm without a recess. Also, in terms of results, a recess is formed in the journal(J)-facing surface of the arm A. Accordingly, the forged crankshaft having the first exemplary configuration can achieve a reduction of weight by the recesses formed in the arms A. Additionally, the maintained thicknesses of the side portions Aa and Ab of the arm A ensure stiffness. In other words, the greater thicknesses of the side portions Aa and Ab in the region near the adjacent pin P than the thickness of the recess ensure stiffness.

The sectional shape of the area As inside of the side portions Aa and Ab (the bottom shape of the recess) is preferably convex and bulges in the center with respect to the width direction as shown in FIG. 2D. In other words, it is preferred that the thickness of the area As gradually decreases with increasing distance from the center with respect to the width direction. Since the bottom shape of the recess is convex and bulges in the center with respect to the width direction, the bending stiffness can be improved. It is possible to form a recess with this bottom shape by making the sectional shape of the central portion with respect to the width direction arc-shaped, semi-elliptic or parabolic, for example.

Figure 3A:
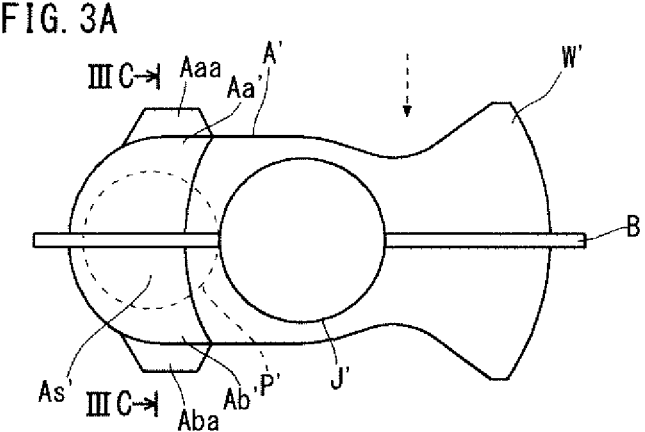
FIG. 3A is a diagram showing the rough-journal-facing surface of a rough arm of a rough forged blank for the crankshaft having the first exemplary configuration.
Figure 3B:
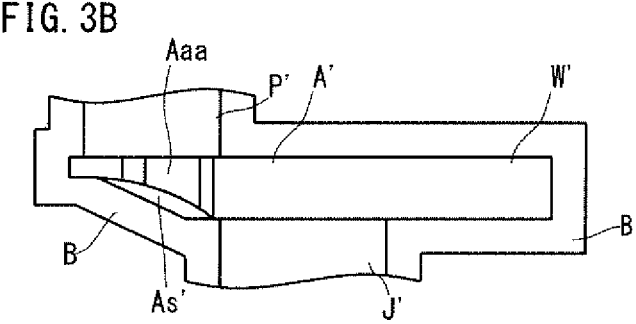
FIG. 3B is a diagram showing a side surface of the rough arm shown in FIG. 3A.
Figure 3C:
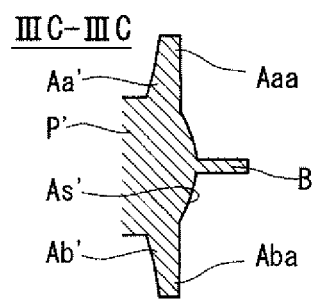
FIG. 3C is a sectional view along the line IIIC-IIIC in FIG. 3A.

FIGS. 3A to 3C are diagrams showing a rough arm of a rough forged blank for the crankshaft having the first exemplary configuration. FIG. 3A is a view showing the rough-journal-facing surface. FIG. 3B is a side view. FIG. 3C is a sectional view along the line IIIC-IIIC in FIG. 3A. FIGS. 3A to 3C show a rough arm (incorporating a rough weight W') extracted from the rough forged blank having a crankshaft shape. FIG. 3B is a view from the direction indicated by the dashed arrow in FIG. 3A.

As shown in FIGS. 3A to 3C, each of the rough arms A' before the finish forging step (after the rough forging step) has a surface shape in agreement with the bottom shape of the recess after the finish forging step in the rough-journal (J')-facing surface, in a region near the adjacent rough pin P', in an area As' inside of the side portions Aa' and Ab'. The surface shape extends smoothly to the side portions Aa' and Ab' in the region near the rough pin P'. Accordingly, the thicknesses of the side portions Aa' and Ab' are smaller than those after the finish forging step.

Each of the rough arms A' has, in the region near the adjacent rough pin P', first excess portions Aaa and Aba on the outer peripheries of the side portions Aa' and Ab'. The first excess portions Aaa and Aba protrude respectively from the outer peripheries of the side portions Aa' and Ab' in the region near the adjacent rough pin P'. The first excess portions Aaa and Aba are plate-shaped, and extend along the outer peripheries of the side portions Aa' and Ab' in the region near the adjacent rough pin P'. The thicknesses of the first excess portions Aaa and Aba are substantially equal to or smaller than the thicknesses of the bases thereof, that is, the side portions Aa' and Ab'.

Figure 4A:
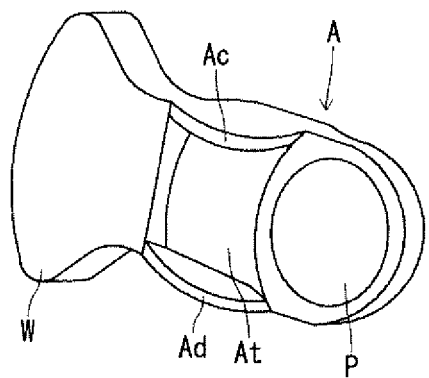
FIG. 4A is a perspective view of an arm of a crankshaft having a second exemplary configuration according to the present invention, schematically showing the pin-facing surface of the arm.
Figure 4B:
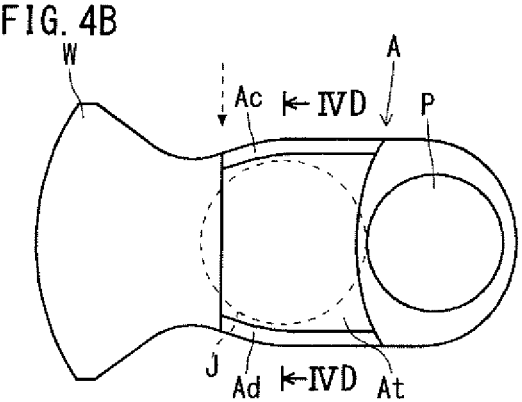
FIG. 4B is a diagram showing the pin-facing surface of the arm shown in FIG. 4A.
Figure 4C:
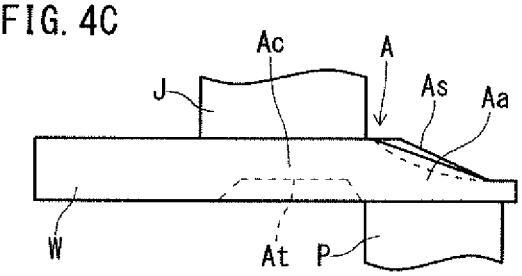
FIG. 4C is a diagram showing a side surface of the arm shown in FIG. 4A.
Figure 4D:
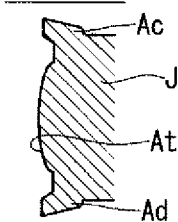
FIG. 4D is a sectional view along the line IVD-IVD in FIG. 4B.

FIGS. 4A to 4D are diagrams showing an arm of the crankshaft having the second exemplary configuration according to the present invention. FIG. 4A is a perspective view, FIG. 4B is a view showing the pin-facing surface, and FIG. 4C is a side view. FIG. 4D is a sectional view along the line IVD-IVD in FIG. 4B. FIGS. 4A to 4D show one of the arms (incorporating a weight) of the crankshaft. FIG. 4C is a view from the direction indicated by the dashed arrow in FIG. 4B.

In the second exemplary configuration, as in the first exemplary configuration, each of the arms A has thick side portions in a region near the adjacent pin P, and has a recess in the journal(J)-facing surface. Further, in the second exemplary configuration, each of the arms A incorporating a weight has a recess in the pin(P)-facing surface, in a region near the adjacent journal J, in an area At inside of both side portions (two side portions) Ac and Ad, as shown in FIGS. 4A to 4D. The side portions Ac and Ad in the region near the journal J bulge toward the adjacent pin P, and the thicknesses of the side portions Ac and Ad are greater than the thickness of the recess. The area At is on the surface opposite to the journal J, that is, on the pin(P)-facing surface.

In the crankshaft having the second exemplary configuration, regarding all the arms A, the side portions in the region near the adjacent pin P are thick, and a recess is formed in the journal(J)-facing surface. Regarding the arms A incorporating a weight, further, the side portions Ac and Ad in the region near the adjacent journal J are kept as thick as those of an arm A without a recess, and in terms of results, a recess is formed also in the pin(P)-facing surface.

Accordingly, the forged crankshaft having the second exemplary configuration can achieve a reduction of weight by the recesses formed in the respective journal(J)-facing surfaces of all the arms A and the recesses formed in the respective pin(P)-facing surfaces of the arms A incorporating a weight. Additionally, the maintained thicknesses of the side portions Aa and Ab in the region near the adjacent pin P and the side portions Ac and Ad in the region near the adjacent journal J ensure the stiffness. In other words, the greater thicknesses of the side portions Aa and Ab in the region near the adjacent pin P and the greater thicknesses of the side portions Ac and Ad in the region near the adjacent journal J than the thicknesses of the recesses ensure stiffness.

Regarding the arms A incorporating a weight, the sectional shape of the area At inside of the side portions Ac and Ad (the bottom shape of the recess) is preferably convex and bulges in the center with respect to the width direction as shown in FIG. 4D. In other words, it is preferred that the thickness of the area At gradually decreases with increasing distance from the center with respect to the width direction. Since the bottom shape of the recess is convex and bulges in the center with respect to the width direction, the bending stiffness can be improved. It is possible to form a recess with this bottom shape by making the sectional shape of the central portion with respect to the width direction arc-shaped, semi-elliptic or parabolic, for example.

Figure 5A:
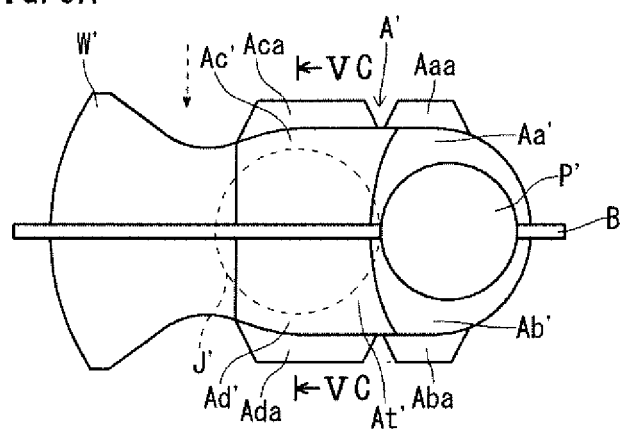
FIG. 5A is a diagram showing the rough-pin-facing surface of a rough arm of a rough forged blank for the crankshaft having the second exemplary configuration.
Figure 5B:
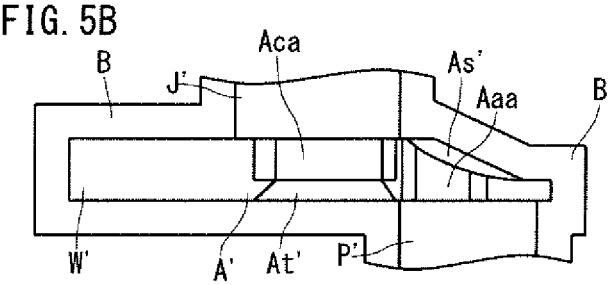
FIG. 5B is a diagram showing a side surface of the rough arm shown in FIG. 5A.
Figure 5C:
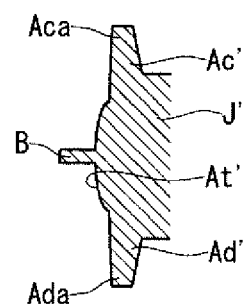
FIG. 5C is a sectional view along the line VC-VC in FIG. 5A.

FIGS. 5A to 5C are diagrams showing a rough arm of a rough forged blank for the crankshaft having the second exemplary configuration. FIG. 5A is a view showing the rough-pin-facing surface. FIG. 5B is a side view. FIG. 5C is a sectional view along the line VC-VC in FIG. 5A. FIGS. 5A to 5C show one of the rough arms (incorporating a rough weight) of the rough forged blank. FIG. 5B is a view from the direction indicated by the dashed arrow in FIG. 5A.

In the second exemplary configuration, as in the first exemplary configuration, each the rough arms A' before the finish forging step (after the rough forging step) has a surface shape in agreement with the bottom shape of the recess after the finish forging step, in the rough-journal(J')-facing surface, in a region near the adjacent rough pin P', in an area As' inside of the side portions Aa' and Ab'. Also, as in the first exemplary configuration, each of the rough arms A' has, in the region near the adjacent rough pin P', first excess portions Aaa and Aba on the outer peripheries of the side portions Aa' and Ab'. The first excess portions Aaa and Aba protrude respectively from the outer peripheries of the side portions Aa' and Ab' in the region near the adjacent rough pin P'.

Additionally, each of the rough arms A' incorporating a rough weight W' has a surface shape in agreement with the bottom shape of the recess after the finish forging step in the rough-pin(P')-facing surface, in a region near the adjacent rough journal J', in an area At' inside of the side portions Ac' and Ad'. The surface shape extends smoothly to the side portions Ac' and Ad' in the region near the adjacent rough journal J'. Accordingly, the thicknesses of the side portions Ac' and Ad' are smaller than those after the finish forging step.

Each of the rough arms A' incorporating a rough weight W' further has, in the region near the adjacent rough journal J', second excess portions Aca and Ada on the outer peripheries of the side portions Ac' and Ad'. The second excess portions Aca and Ada protrude respectively from the outer peripheries of the side portions Ac' and Ad' in the region near the adjacent rough journal J'. The second excess portions Aca and Ada shown in FIGS. 5A to 5C are plate-shaped, and extend along the outer peripheries of the side portions Ac' and Ad' in the region near the adjacent rough journal J'. The thicknesses of the second excess portions Aca and Ada are substantially equal to or smaller than the thicknesses of the bases thereof, that is, the side portions Ac' and Ad'.

FIGS. 6A and 6B are diagrams showing an arm of the crankshaft having the third exemplary configuration according to the present invention. FIG. 6A is a view showing the pin-facing surface. FIG. 6B is a sectional view along the line VIB-VIB in FIG. 6A. FIGS. 6A and 6B show one of the arms of the finished crankshaft, and the shape is attained, for example, by applying trimming to the finish forged blank.

The crankshaft having the third exemplary configuration includes a plurality of arms, and only some of the arms incorporate a weight. FIGS. 6A and 6B show one of the arms not incorporating a weight, that is, one of the unweighted arms of the crankshaft.

In the third exemplary configuration, as in the first exemplary configuration, each of the arms, whether incorporating a weight or not, has thick side portions in a region near the adjacent pin P and has a recess in the journal-facing surface, though it is not shown in the drawings. In the third exemplary configuration, as shown in FIGS. 6A and 6B, each of the unweighted arms A further has a recess in the pin P-facing surface, in a region near the adjacent journal J, in an area At inside of side portions Ac and Ad. The side portions Ac and Ad in the region near the adjacent journal J bulge toward the adjacent pin P, and the thicknesses of the side portions Ac and Ad are greater than the thickness of the recess.

In the crankshaft having the third exemplary configuration, regarding all the arms A, the side portions Aa and Ab in the region near the adjacent pin P are thick, and a recess is formed in the journal J-facing surface. Regarding the unweighted arms A, further, the side portions Ac and Ad in the region near the adjacent journal J are kept as thick as those of an arm A without a recess. Also, in terms of results, each of the unweighted arms A obtains a recess in the pin P-facing surface.

Accordingly, the forged crankshaft having the third exemplary configuration can achieve a reduction of weight by the recesses formed in the respective journal J-facing surfaces of all the arms A and the recesses formed in the respective pin P-facing surfaces of the unweighted arms A. Additionally, the maintained thicknesses of the side portions Aa and Ab in the region near the adjacent pin P and the side portions Ac and Ad in the region near the adjacent journal J ensure stiffness. In other words, the greater thicknesses of the side portions Aa and Ab in the region near the pin adjacent P and the greater thicknesses of the side portions Ac and Ad in the region near the adjacent journal J than the thicknesses of the recesses ensure stiffness.

Regarding the unweighted arms A, the sectional shape of the area At inside of the side portions Ac and Ad (the bottom shape of the recess) is preferably convex and bulges in the center with respect to the width direction as shown in FIG. 6B. In other words, it is preferred that the thickness of the area At gradually decreases with increasing distance from the center with respect to the width direction. Since the bottom shape of the recess is convex and bulges in the center with respect to the width direction, the bending stiffness can be improved. It is possible to form a recess with this bottom shape by making the sectional shape of the central portion with respect to the width direction arc-shaped, semi-elliptic or parabolic, for example.

Figure 7A:
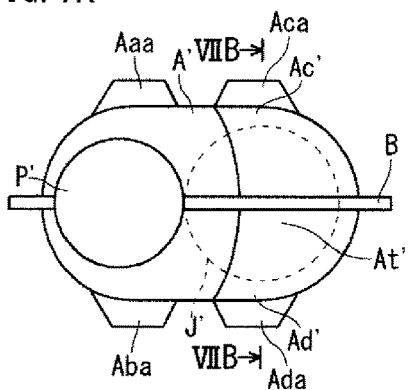
FIG. 7A is a diagram showing the rough-pin-facing surface of a rough arm of a rough forged blank for the crankshaft having the third exemplary configuration.
Figure 7B:
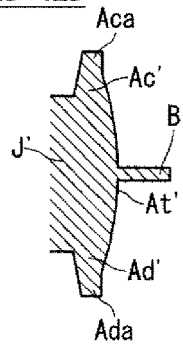
FIG. 7B is a sectional view along the line VIIB-VIIB in FIG. 7A.

FIGS. 7A and 7B are diagrams showing a rough arm of a rough forged blank for the crankshaft having the third exemplary configuration. FIG. 7A is a view showing the rough-pin-facing surface. FIG. 7B is a sectional view along the line VIIB-VIIB in FIG. 7A. FIGS. 7A and 7B show one of the rough unweighted arms of the rough forged blank having a crankshaft shape.

In the third exemplary configuration, as in the first exemplary configuration, each of the rough arms A' before the finish forging step (after the rough forging step), whether incorporating a rough weight or not, has a surface shape in agreement with the bottom shape of the recess after the finish forging step, in the rough-journal(J')-facing surface, in a region near the adjacent rough pin P', in an area inside of the side portions, though it is not shown in the drawings. Also, as in the first exemplary configuration, each of the rough arms A' has, in the region near the adjacent rough pin P', first excess portions Aaa and Aba on the outer peripheries of the side portions. The first excess portions Aaa and Aba protrude respectively from the outer peripheries of the side portions in the region near the adjacent rough pin P'.

Additionally, each of the rough unweighted arms A' has a surface shape in agreement with the bottom shape of the recess after the finish forging step, in the rough-pin(P')-facing surface, in a region near the adjacent rough journal J', in an area At' inside of the side portions Ac' and Ad'. The surface shape extends smoothly to the side portions Ac' and Ad' in the region near the adjacent rough journal J'. Accordingly, the thicknesses of the side portions Ac' and Ad' are smaller than those after the finish forging step.

Each of the unweighted rough arms A' further has, in the region near the adjacent rough journal J', second excess portions Aca and Ada on the outer peripheries of the side portions Ac' and Ad'. The second excess portions Aca and Ada protrude respectively from the outer peripheries of the side portions Ac' and Ad' in the region near the adjacent rough journal J'. The second excess portions Aca and Ada are plate-shaped, and extend along the outer peripheries of the side portions Ac' and Ad' in the region near the adjacent rough journal J'. The thicknesses of the second excess portions Aca and Ada are substantially equal to or smaller than the thicknesses of the bases thereof, that is, the side portions Ac' and Ad'.

2. Production Process of Forged Crankshaft

A forged crankshaft production method according to the present embodiment includes a rough forging step and a finish forging step. Before the rough forging step, for example, a preforming step may be executed as in a conventional production process. After the finish forging step, for example, a trimming step may be additionally executed as in a conventional production process. Further, a coining step may be executed after the trimming step, as needed. When adjustment of placement angles of the pins is necessary, a twisting step is executed after the trimming step. These steps are to apply hot working and are to be executed sequentially. The forged crankshaft production method according to the present embodiment may employ a conventional production method in the parts other than the distinctive features of the present invention. For example, the production process according to the present invention may include at least one of the steps shown in FIGS. 1A to 1F or one or more steps adapted from those shown in FIG. 1A to 1F for the present invention as steps other than the distinctive features of the present invention.

The preforming step includes a rolling step and a bending step, for example. In the rolling step and the bending step, the volume of a billet (starting material) is distributed, whereby a bent blank is obtained.

In the rough forging step, for example, the bent blank obtained by the preforming step is die-forged, whereby a rough forged blank with flash is obtained. The obtained rough forged blank is roughly in the shape of a crankshaft as shown in FIGS. 3A to 3C. The rough forged blank includes rough journals J', rough pins P', rough arms A' and others. Additionally, each of the rough arms A' of the rough forged blank has, in a region near the adjacent pin, first excess portions Aaa and Aba protruding from the outer peripheries of side portions Aa' and Ab'. Accordingly, in the rough forging step, dies that allow formation of such excess portions (first excess portions or second excess portions, or first and second excess portions) are used for the die forging.

In the die forging in the rough forging step, the draft never becomes a reverse draft. Specifically, the draft of the dies never becomes a reverse draft at any portions corresponding to the bottom surfaces of the recesses to be formed in the rough-journal(J')-facing surfaces of the rough arms A' (inner areas As') and at any portions corresponding to the first excess portions Aaa and Aba. In other words, the rough forged blank having the above-described shape can be produced by use of dies having no reverse draft. Therefore, the rough forging by die forging can be carried out with no trouble, and a rough forged blank as shown in FIGS. 3A to 3C can be obtained. Also, in producing a rough forged blank as shown in FIGS. 5A to 5C and in producing a rough forged blank as shown in FIGS. 7A and 7B, the draft never becomes a reverse draft at any portions corresponding to the bottom surfaces of the recesses to be formed in the rough-journal (P')-facing surfaces of the rough arms A' (inner areas At') and at any portions corresponding to the second excess portions Aca and Ada. In other words, the rough forged blank having the above-described shape can be produced by use of dies having no reverse draft. Therefore, the rough forging by die forging can be carried out with no trouble.

In the finish forging step, the rough forged blank is die-forged by use of a pair of dies. Then, a finish forged blank with flash is obtained. The finish forged blank has a shape substantially in agreement with the finished crankshaft. In the finish forging step, further, the first excess portions are deformed by the pair of dies to bulge toward the rough journals. Thereby, the thicknesses of the side portions of the rough arms in the region near the rough pins are increased. The details of the finish forging step will be described later.

In the trimming step, for example, while the finish forged blank with flash is held, the flash is punched out. Thereby, the flash is removed from the finish forged blank, and then, a forged blank with no flash is obtained. In the coining step, main parts of the forged blank with no flash may be slightly pressed by dies from above and below so that the forged blank with no flash can have the exact size and shape of a finished product. By the production method according to the present invention, a forged crankshaft is obtained.

3. Exemplary Process Flow of Finish Forging Step

Figure 8A:
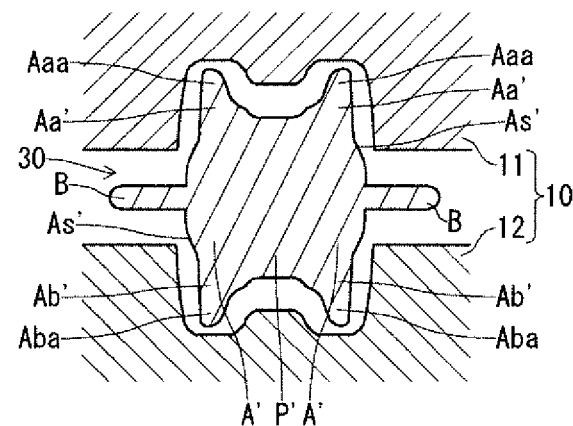
FIG. 8A is a sectional view of a rough forged blank at the time when the rough forged blank has been placed in dies in an exemplary process flow of the finish forging step according to the present invention.
Figure 8B:
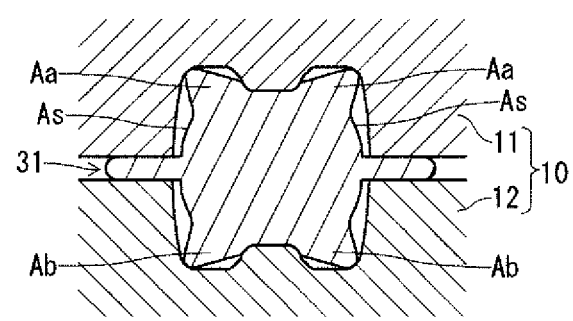
FIG. 8B is a sectional view of the rough forged blank at the time when reduction has been completed in the exemplary process flow of the finish forging step according to the present invention.

FIGS. 8A and 8B are sectional views showing an exemplary process flow of the finish forging step of the crankshaft production method according to the present invention. FIG. 8A shows the time when the rough forged blank has been placed in a pair of dies, and FIG. 8B shows the time of completion of reduction. FIGS. 8A and 8B are sectional views at a position corresponding to the position indicated by the line IIIC-IIIC in FIG. 3A.

In FIG. 8A, a rough forged blank 30 with flash, and a first pair of dies 10 are shown. The shape of the rough forged blank 30 with flash is the same as the shape of the rough forged blank 30 with flash shown in FIGS. 3A to 3C. The rough forged blank 30 has a crankshaft shape. FIG. 8A shows a rough pin P' and two rough arms A' connected to the rough pin P', which are extracted from the rough forged blank 30.

The first pair of dies 10 includes an upper die (first upper die) 11 and a lower die (first lower die) 12. The upper die 11 and the lower die 12 are movable to separate from each other and movable to come close to each other. In the die forging by use of the first pair of dies 10, while the rough forged blank 30 is positioned between the upper die 11 and the lower die 12, the upper die 11 and the lower die 12 are moved toward each other. Thereby, the upper die 11 and the lower die 12 are pressed against the rough forged blank 30, and the rough forged blank 30 is reduced.

The upper die 11 and the lower die 12 have impressions to shape the rough forged blank 30 and to deform the protruding excess portions. The impressions reflect a shape substantially in agreement with the shape of a finished product, that is, the crankshaft. However, the impressions do not reflect the shapes of some parts of the crankshaft.

Specifically, when recesses are to be formed in the respective journal-facing surfaces of the arms (see FIGS. 2A to 2D), the impressions of the dies do not reflect the shapes of the recesses in the respective journal-facing surfaces. When recesses are to be formed in the respective pin-facing surfaces of the arms (see FIGS. 4A to 4D, 6A and 6B), the impressions of the dies do not reflect the shapes of the recesses in the respective pin-facing surfaces. If the impressions reflect the shapes of these recesses, the impressions will partly have a reverse draft.

In the process flow using the first pair of dies 10, first, the upper die 11 and the lower die 12 are separated from each other. Then, as shown in FIG. 8A, the rough forged blank 30 with flash is placed between the upper die 11 and the lower die 12.

Next, the upper die 11 and the lower die 12 are moved toward each other. More specifically, the upper die 11 is moved to the bottom dead point. Thereby, as shown in FIG. 8B, the upper die 11 and the lower die 12 are pressed against the rough forged blank 30, and the rough forged blank 30 is reduced by the upper die 11 and the lower die 12. By the reduction by use of the first pair of dies 10, the rough forged blank 30 is formed into a shape substantially in agreement with the finished crankshaft. Then, a finish forged blank 31 as shown in FIG. 8B is obtained. Each part of the finish forged blank 31 shown in FIG. 8B has a shape substantially in agreement with the shape of the corresponding part of the finished forged crankshaft. Therefore, in FIG. 8B, each part of the finish forged blank 31 is denoted by the same reference symbol used for the corresponding part of the finished forged crankshaft.

In the forged crankshaft production method according to the present embodiment, further, the first excess portions Aaa and Aba are deformed by the first pair of dies 10 during the process of die forging (during the reduction by use of the first pair of dies 10). For example, the first excess portions Aaa and Aba are crushed by the first pair of dies 10 or are bent toward the rough journals along the first pair of dies 10. Thereby, the first excess portions Aaa and Aba are formed into shapes along the first pair of dies 10 and are caused to bulge toward the rough journals. Consequently, the thicknesses of the side portions Aa' and Ab' of each of the rough arms A' in the region near the adjacent rough pin P' are increased.

In the rough forged blank 30, as shown in FIG. 8A, each of the rough arms A' has a surface shape in agreement with the bottom surface of the recess in the rough-journal-facing surface, in the region near the adjacent rough pin P', in the area As' inside of the side portions Aa' and Ab'. The surface shape of the inner area As' is kept during the die forging. Meanwhile, during the process of die forging, the side portions Aa' and Ab' in the region near the adjacent rough pin P' are caused to bulge toward the adjacent rough journal. Consequently, in the rough forged blank after undergoing the finish forging (in a finish forged blank), the rough-journal-facing surface of each rough arm A' has a recess in the area As inside of the side portions.

The central portion of the area As is convex as shown in FIG. 8B. The border between the flash B and another part in the central portion may be outside the line connecting the respective edges of the side portions Aa and Ab of the finish forged blank 31. This structure facilitates the trimming.

Next, the upper die 11 and the lower die 12 are separated from each other. More specifically, the upper die 11 is moved up to the top dead point. In this state, the rough forged blank after undergoing the reduction (finish forged blank) is taken out.

In the forged crankshaft production method according to the present embodiment, which includes the finish forging step, the thicknesses of the side portions Aa and Ab of each arm A in the region near the adjacent pin P can be increased in the finish forging step. Also, a recess is formed in the journal(J)-facing surface of the arm A. According to the present invention, the finish forging step can be carried out by use of a pair of dies which does not have a reverse draft.

In the steps after the finish forging step (for example, in the trimming step and the coining step), the shape of the recess in the journal-facing surface of each arm is maintained. When a recess is formed in the pin-facing surface of any arm (see FIGS. 4A to 4D, 6A and 6B), the shape of the recess in the pin-facing surface is also maintained. For example, if the impressions of the dies used to hold the finish forged blank in the trimming step do not reflect the shapes of the recess as the impressions of the dies used in the finish forging step, the shapes of the recesses can be maintained in the trimming step. Further, if the impressions of the dies used to hold the finish forged blank in the coining step do not reflect the shapes of the recess as the impressions of the dies used in the finish forging step, the shapes of the recesses can be maintained in the coining step.

Thus, the forged crankshaft production method according to the present embodiment provides a finished product, wherein each of the arms A has thickened side surfaces Aa and Ab in the region near the adjacent pin P and has a recess in the journal-facing surface. Accordingly, the forged crankshaft production method according to the present embodiment allows production of a forged crankshaft with a reduced weight and assured stiffness.

In the forged crankshaft production method according to the present embodiment, in the forging step, the first excess portions Aaa and Aba are deformed by the pair of dies used for the die forging, whereby the thicknesses of the side portions of each rough arm in the region near the adjacent rough pin are increased. Thus, any special tool, such as a punch or the like, is not necessary for the deformation of the first excess portions, and the deformation can be carried out in a simple manner by use of the existing equipment. Also, it is not necessary to make any changes to the conventional production process.

The forged crankshaft production method according to the present embodiment is applicable to production of the forged crankshaft having the second exemplary configuration as shown in FIGS. 4A to 4D. In this case, in the rough forged blank, each of the rough arms incorporating a rough weight has second excess portions Aca and Ada as shown in FIGS. 5A to 5C. The second excess portions Aca and Ada protrude respectively from the outer peripheries of the side portions of the rough arm A' in the region near the adjacent rough journal J'.

During the process of die forging in the finish forging step, not only are the first excess portions Aaa and Aba deformed by the dies, but the second excess portions Aca and Ada provided to each of the rough arms A' incorporating a rough weight shall be also deformed by the dies to bulge toward the adjacent rough pin P'. Thereby, regarding each of the rough arms A' incorporating a rough weight, the thicknesses of the side portions Ac' and Ad' in the region near the adjacent rough journal J' can be increased. The deformation of the second excess portions may be performed, for example, by crushing or bending. Consequently, a crankshaft with a more reduced weight and assured stiffness as shown in FIGS. 4A to 4D can be obtained.

The forged crankshaft production method according to the present embodiment is applicable to the forged crankshaft having the third exemplary configuration as shown in FIGS. 6A and 6B. In the forged crankshaft, only some of the arms A incorporate a weight, and the other arms A are unweighted arms which incorporate no weight.

In this case, in the rough forging step, second excess portions Aca and Ada are formed for each of the unweighted arms A' as shown in FIGS. 7A and 7B. The second excess portions Aca and Ada protrude respectively from the outer peripheries of the side portions of each of the rough unweighted arms A' in the region near the adjacent rough journal J'.

During the process of die forging in the finish forging step, not only are the first excess portions Aaa and Aba deformed by the dies, but the second excess portions Aca and Ada provided to each of the rough unweighted arms A' shall be also deformed by the dies to bulge toward the adjacent rough pin P'. Thereby, regarding each of the rough unweighted arms A', the thicknesses of the side portions Ac' and Ad' in the region near the adjacent rough journal J' can be increased. The deformation of the second excess portions may be performed, for example, by crushing or bending. Consequently, a crankshaft with a more reduced weight and assured stiffness as shown in FIGS. 6A and 6B can be obtained.

According to the present embodiment, the above-described second die may be used in combination with the first pair of dies in the finish forging step. Alternatively, in the finish forging step, the first pair of dies, the above-described second die and the holder may be used in combination.

An example of the finish forging step in which the first pair of dies, the second die and the holder are used in combination is described with reference to FIGS. 9A, 9B and 9C. In the example to be described below, the finish forging is applied to a rough forged blank for a crankshaft having the first exemplary configuration as shown in FIGS. 3A to 3C. However, the finish forging by use of the second die and the holder in combination with the first pair of dies is applicable also to other rough forged blanks (for example, rough forged blanks for a crankshaft having the second exemplary configuration and for a crankshaft having the third exemplary configuration). In the example to be described below, both the second die and the holder are used in combination with the first pair of dies. However, only the second die may be used in combination with the first pair of dies.

Figure 9A:
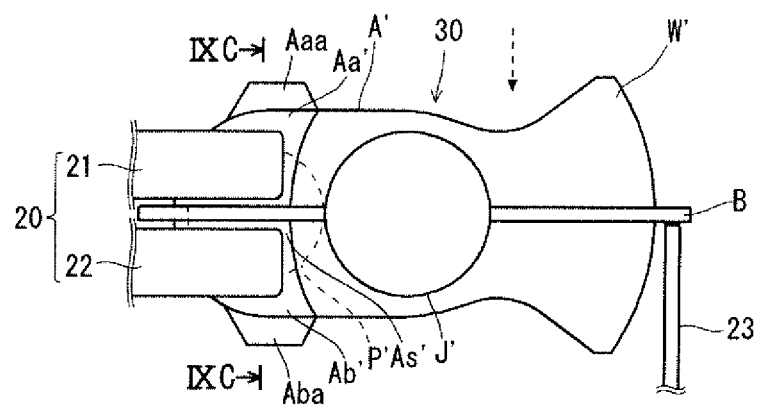
FIG. 9A is a view showing an example of the finish forging step according to the present invention.
Figure 9B:
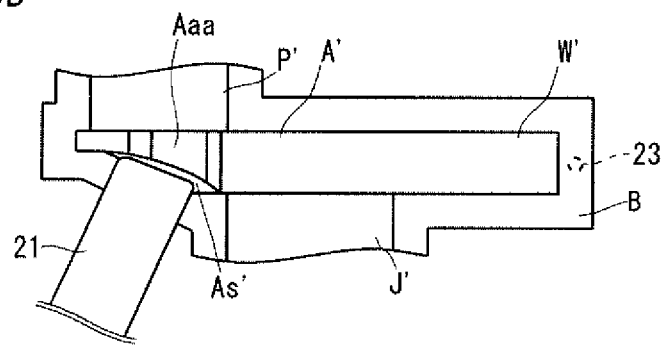
FIG. 9B is a side view showing the example of the finish forging step shown in FIG. 9A.

FIG. 9A is a view of a rough arm A' of the rough forged blank from the adjacent rough journal FIG. 9B is a view from the direction indicated by the dashed arrow in FIG. 9A. FIG. 9C is a sectional view along the line IXC-IXC in FIG. 9A. The matters already described with reference to FIGS. 8A and 8B may not be described repeatedly.

In this example, the second die 20 is used. Further, the holder 23 is used to hold the lower surface of the flash B. In this example, a plurality of holders 23 are used. The drawings which will be referred to below show only a part of the rough forged blank and accordingly show only one holder 23.

Figure 9C:
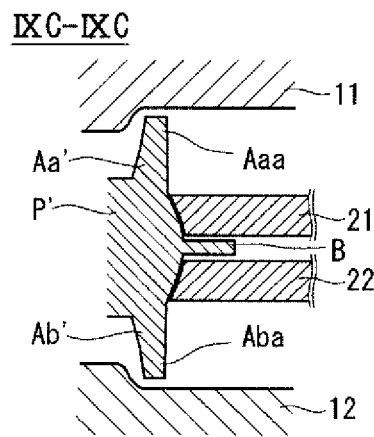
FIG. 9C is a sectional view showing the example of the finish forging step shown in FIG. 9A.

First, the dies are placed as shown in FIGS. 9A to 9C. Specifically, a rough forged blank 30 is placed between the upper die 11 and the lower die 12 of the first pair of dies 10. At this time, the lower surface of the flash B is held by the plurality of holders 23. The plurality of holders 23 hold the rough forged blank 30 such that the flash B is kept in a horizontal posture. Further, a second pair of dies 20 is placed such that a second die 21 and a second die 22 face each other across the flash B. At this time, the second pair of dies 20 is placed against the surface of the rough crank arm A' having the first excess portions Aaa and Aba, in the portion opposite to the adjacent rough pin P'. More specifically, the second pair of dies 20 is placed against the rough-journal(J')-facing surface of the rough crank arm A', in the area As' inside of the two side portions Aa' and Ab' in the region near the adjacent rough pin P'. With this arrangement, the second pair of dies 20 prevents deformation of the area As' during the finish forging step. In order to prevent the deformation of the area As', the surfaces of the second pair of dies 20 to contact the area As' preferably have shapes that fit in the inner area As', that is, shapes proper for a tight connection with the area As'. In a case where the rough arm A' has only one first excess portion in one side portion, only one of the second dies may be placed against the surface, in the side where the first excess portion is provided.

There is no limit as to the order of placing the dies. In a preferred example, the rough forged blank 30 placed between the upper die 11 and the lower die 12 is held by the holders 23, and thereafter, the second pair of dies 20 is placed against the rough forged blank 30.

Next, as has been described with reference to FIG. 8B, the upper die 11 and the lower die 12 are moved toward each other, and the rough forged blank 30 is reduced by the upper die 11 and the lower die 12. Along with the reduction by use of the first pair of dies 10, the rough forged blank 30 is formed into a shape substantially in agreement with the shape of the finished forged crankshaft. At this time, the first excess portions Aaa and Aba are deformed to bulge toward the rough journal J' as described above.

In a case where the upper die 11 is moved down to perform the finish forging, the upper die 11 first comes into contact with the rough forged blank 30, and thereafter, the lower die 12 comes into contact with the rough forged blank 30 along with the downward movement of the rough forged blank 30. As the upper die 11 is moving further down, the rough forged blank 30 is deformed. In this case, along with the movement of the first pair of dies 10 (downward movement of the upper die 11), the flash B moves down. Accordingly, the holders 23 move down along with the downward movement of the flash B while keeping holding the lower surface of the flash B. In other words, the holders 23 moves following the flash B which changes its position along with the movement of the first pair of dies 10. By use of the holders 23, the finish forging can be performed while the rough forged blank 30 is kept in a stable posture.

The finish forging is carried out in the manner described above, and thereby, a finish forged blank with flash is obtained. After the finish forging step, the second pair of dies 20 and the holders 23 are retracted as needed, and the finish forged blank is taken out.

In a case where the rough forged blank includes second excess portions, the third die may be used in combination with the first pair of dies in the finish forging step. Alternatively, the second die and the third die may be used in combination with the first pair of dies in the finish forging step. It is also possible to use the second die, holder and the third die in combination with the first pair of dies in the finish forging step.

An example of the finish forging step in which the holder and the third die are used in combination with the first pair of dies is described with reference to FIGS. 10A, 10B and 10C. In the example to be described below, the finish forging is applied to a rough forged blank for a crankshaft having the second exemplary configuration as shown in FIGS. 5A to 5C. However, the finish forging by use of the holder and the third die in combination with the first pair of dies is applicable also to other rough forged blanks (for example, a rough forged blank for a crankshaft having the third exemplary configuration). In the example to be described below, both the holder and the third die are used in combination with the first pair of dies. However, only the third die may be used in combination with the first pair of dies. In either case, the second die can be further used.

Figure 10A:
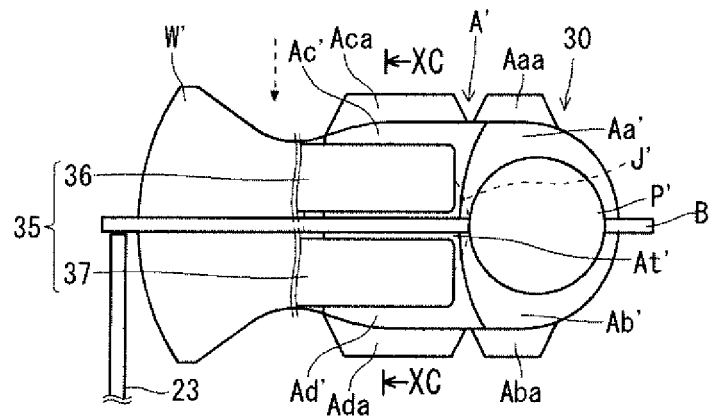
FIG. 10A is a view showing another example of the finish forging step according to the present invention.

FIG. 10A is a view of a rough-pin(P')-facing surface of a rough arm A' of the rough forged blank. FIG. 10B is a view from the direction indicated by the dashed arrow in FIG. 10A. FIG. 10C is a sectional view along the line XC-XC in FIG. 10A. The matters that have been described with reference to FIGS. 8A and 8B may not be described repeatedly.

In this example, the third die 35 is used. Further, a plurality of holders 23 are used to hold the lower surface of the flash B. The drawings which will be referred to below show only a part of the rough forged blank and accordingly show only one holder 23.

Figure 10B:
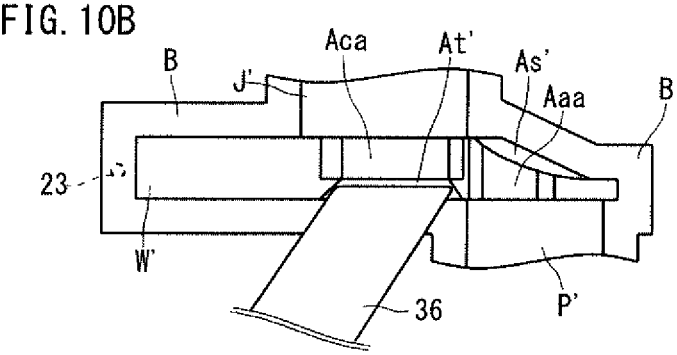
FIG. 10B is a side view showing the example of the finish forging step shown in FIG. 10A.
Figure 10C:
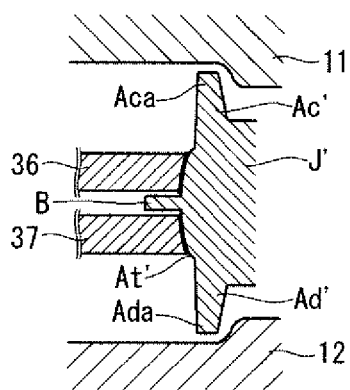
FIG. 10C is a sectional view showing the example of the finish forging step shown in FIG. 10A.

First, the dies are placed as shown in FIGS. 10A to 10C. Specifically, a rough forged blank 30 is placed between the upper die 11 and the lower die 12 of the first pair of dies 10. At this time, the lower surface of the flash B is held by the plurality of holders 23. Further, a third pair of dies 35 is placed such that a third die 36 and a third die 37 face each other across the flash B. At this time, the third pair of dies 35 is placed against the surface of the rough crank arm A' having the second excess portions Aca and Ada, in the portion opposite to the adjacent rough journal J'. More specifically, the third pair of dies 35 is placed against the rough-pin(P')-facing surface of the rough crank arm A', in the area At' inside of the two side portions Ac' and Ad' in the region near the adjacent rough journal J'. With this arrangement, the third pair of dies 35 prevents deformation of the inner area At' during the finish forging step. In order to prevent the deformation of the area At', the surfaces of the third pair of dies 35 to contact the area At' preferably have shapes that fit in the area At', that is, shapes proper for a tight connection with the area At'. In a case where the rough arm A' has only one second excess portion in one side portion, only one of the third dies may be placed against the surface, in the side where the second excess portion is provided.

There is no limit as to the order of placing the dies. In a preferred example, the rough forged blank 30 placed between the upper die 11 and the lower die 12 is held by the holders 23, and thereafter, the third dies 35 are placed against the rough forged blank 30. In a case where the second dies 20 are used in combination with the third dies 35, the dies are arranged as shown in FIGS. 9A to 9C.

Next, as has been described with reference to FIG. 8B, the upper die 11 and the lower die 12 are moved toward each other, and the rough forged blank 30 is reduced by the upper die 11 and the lower die 12. Along with the reduction by use of the first pair of dies 10, the rough forged blank 30 is formed into a shape substantially in agreement with the shape of the finished forged crankshaft. At this time, the second excess portions Aca and Ada are deformed to bulge toward the rough journal P' as described above. The holders 23 move in the above-described manner.

The finish forging is carried out in the manner described above, and thereby, a finish forged blank with flash is obtained. In the finish forging step of the production method according to the present invention, as described above, the rough forged blank 30 can be shaped by one-time reduction by use of the first pair of dies 10, and during the shaping of the rough forged blank 30, the excess portions (first excess portions or second excess portions, or first and second excess portions) can be deformed. After the finish forging step, the third dies 35 and the holders 23 are retracted as needed, and the finish forged blank is taken out.

The first pair of dies 10, the second die 20, the holder 23 and the third die 35 have shapes that do not block one another's movements and move in such a manner not to block one another's movements. These dies are moved in such a manner to allow the above-described operation. These dies may be moved by a conventional mechanism. For example, the second die 20, the holder 23 and the third die 35 may be moved by a mechanism used in a conventional double-acting pressing machine.

In either of the crankshafts having the first, the second and the third configurations, all of the arms, whether incorporating a weight or not, have a recess in the journal-facing surface, in a region near the adjacent pin. In a crankshaft to be produced by the crankshaft production method according to the present embodiment, some of the arms may have a recess in the journal-facing surface, in a region near the adjacent pin. In other words, at least one of the rough arms of a rough forged blank have first excess portions. Which of the rough arms are to be provided with the first excess portions shall be determined as appropriate according to the bending stiffness and the torsional stiffness required in each arm of the crankshaft and in what portions the crankshaft is required to have high stiffness.

As described above, an arm incorporating a weight (which will be referred to as a "weighted arm") preferably has a recess in the pin-facing surface, in a region near the adjacent journal. In a crankshaft including a plurality of weighted arms, all of the weighted arms may have a recess in the pin-facing surface, in a region near the adjacent journal. Alternatively, some of the weighted arms may have a recess in the pin-facing surface. In other words, at least one of the rough weighted arms of a rough forged blank may have second excess portions. Which of the rough arms are to be provided with the second excess portions shall be determined as appropriate according to the bending stiffness and the torsional stiffness required in each arm of the crankshaft and in what portions the crankshaft is required to have high stiffness.

As described above, an unweighted arm preferably has a recess in the pin-facing surface, in a region near the adjacent journal. In a crankshaft including a plurality of unweighted arms, all of the unweighted arms may have a recess in the pin-facing surface, in a region near the adjacent journal. Alternatively, some of the unweighted arms may have a recess in the pin-facing surface. In other words, at least one of the rough unweighted arms of a rough forged blank may have second excess portions. Which of the rough arms are to be provided with the second excess portions shall be determined as appropriate according to the bending stiffness and the torsional stiffness required in each arm of the crankshaft and in what portions the crankshaft is required to have high stiffness.

The rough arm may have first excess portions on both sides in the region near the adjacent rough pin as has been described in connection with the first to the third exemplary configurations, or alternatively, the rough arm may have a first excess portion only on one side in the region near the adjacent rough pin. Even in a case where the rough arm has a first excess portion only on one side in the region near the adjacent rough pin, the finish forging step to cause the first excess portion to bulge toward the rough journal provides an increase in the thickness of the side portion. This ensures stiffness while reducing the weight. Which side of the rough arm is to be provided with the first excess portion shall be determined as appropriate according to the bending stiffness and the torsional stiffness required in the arm and in what portion the arm is required to have high stiffness.

In a case where the rough arm has a first excess portion only on one side, it is preferred that the first excess portion is deformed by the first pair of dies to bulge toward the rough journal while the second die is being pressed against the rough-journal-facing surface of the rough arm, between the first excess portion and the flash.

In a case where a rough weighted arm has one or two second excess portions, the rough weighted arm may have second excess portions on both sides in the region near the adjacent rough journal as has been described in connection with the second exemplary configuration. Alternatively, the rough weighted arm may have a second excess portion on only one side in the region near the rough journal. Even in a case where the rough arm has a second excess portion only on one side in the region near the adjacent rough pin, the finish forging step to cause the second excess portion to bulge toward the rough pin provides an increase in the thickness of the side portion. This ensures stiffness while reducing the weight. Which side of the rough arm is to be provided with the second excess portion shall be determined as appropriate according to the bending stiffness and the torsional stiffness required in the arm and in what portion the arm is required to have high stiffness. In a case where the rough arm has a second excess portion only on one side, it is preferred that the second excess portion is deformed by the first pair of dies to bulge toward the rough pin while the third die is being pressed against the rough-pin-facing surface of the rough arm, between the second excess portion and the flash.

In a case where a rough unweighted arm has one or two second excess portions, the rough unweighted arm may have second excess portions on both sides in the region near the adjacent rough journal as has been described in connection with the third exemplary configuration. Alternatively, the rough unweighted arm may have a second excess portion on only one side in the region near the rough journal. Even in a case where the rough arm has a second excess portion only on one side in the region near the adjacent rough pin, the finish forging step to cause the second excess portion to bulge toward the rough pin provides an increase in the thickness of the side portion. This ensures stiffness while reducing the weight. Which side of the rough arm is to be provided with the second excess portion shall be determined as appropriate according to the bending stiffness and the torsional stiffness required in the arm and in what portion the arm is required to have high stiffness. In a case where the rough arm has a second excess portion only on one side, it is preferred that the second excess portion is deformed by the first pair of dies to bulge toward the rough pin while the third die is being pressed against the rough-pin-facing surface of the rough arm, between the second excess portion and the flash.

INDUSTRIAL APPLICABILITY

The present invention is efficiently utilized in a forged crankshaft production method, for example, in a method for producing a forged crankshaft to be mounted in a reciprocating engine.

LIST OF REFERENCE SYMBOLS

1: forged crankshaft
J, J1 to J5: journal
P, P1 to P4: pin
Fr: front part
Fl: flange
A, A1 to A8: crank arm
W, W1 to W8: counterweight
J': rough journal
P': rough pin
A': rough crank arm
W': rough counterweight
Aa, Ab: side portion of an arm in a region near a pin
Aa', Ab': side portion of a rough arm in a region near a rough pin
Aaa, Aba: first excess portion
Ac, Ad: side portion of an arm in a region near a journal
Ac', Ad': side portion of a rough arm in a region near a rough journal
Aca, Ada: second excess portion
As: inner area of a journal-facing surface of an arm, inside of side portions
As': inner area of a rough-journal-facing surface of a rough arm, inside of side portions
At: inner area of a pin-facing surface of an arm, inside of side portions
At': inner area of a rough-pin-facing surface of a rough arm, inside of side portions
B: flash
10: first pair of dies
11: upper die
12: lower die
20, 21, 22: second die
23: holder
30: rough forged blank
31: finish forged blank
35, 36, 37: third die

The invention claimed is:

1. A method for producing a forged crankshaft including journals serving as a center of rotation, pins decentered from the journals, and crank arms connecting the journals and the pins, wherein
the forged crankshaft further includes counterweights integrated with all or some of the crank arms,
the method comprising:
a rough forging step of performing die forging to obtain a rough forged blank with flash having a crankshaft shape; and
a finish forging step of applying die forging by use of a first pair of dies to the rough forged blank to obtain a finish forged blank with flash, wherein:
the rough forged blank includes rough journals, rough pins, rough crank arms, and rough counterweights, which correspond to the journals, the pins, the crank arms, and the counterweights of the forged crankshaft, respectively;
at least one of the rough crank arms has, in a region near an adjacent one of the rough pins, a first excess portion protruding from an outer periphery of a side portion of the rough crank arm; and
during the die forging in the finish forging step, the first excess portion is deformed by the first pair of dies to bulge toward an adjacent one of the rough journals.

2. The method for producing a forged crankshaft according to claim 1, wherein
the rough crank arm has, in the region near the adjacent rough pin, first excess portions respectively protruding from outer peripheries of two side portions of the rough crank arm.

3. The method for producing a forged crankshaft according to claim 2, wherein in the finish forging step, the first excess portion is deformed by the first pair of dies to bulge toward the adjacent rough journal while a second die is in contact with a rough-journal-facing surface of the rough crank arm at a portion between the first excess portion and the flash.

4. The method for producing a forged crankshaft according to claim 3, wherein
in the finish forging step, the first excess portion is deformed by the first pair of dies to bulge toward the adjacent rough journal while a holder is holding a lower surface of the flash;
the holder moves along with a movement of the first pair of dies while keeping holding the lower surface of the flash.

5. The method for producing a forged crankshaft according to claim 3, wherein
at least one of the rough crank arms has, in a region near an adjacent one of the rough journals, a second excess portion protruding from an outer periphery of a side portion of the rough crank arm; and
during the die forging of the rough forged blank in the finish forging step, the second excess portion is deformed by the first pair of dies to bulge toward the adjacent rough pin.

6. The method for producing a forged crankshaft according to claim 2, wherein
in the finish forging step, the first excess portion is deformed by the first pair of dies to bulge toward the adjacent rough journal while a holder is holding a lower surface of the flash;
the holder moves along with a movement of the first pair of dies while keeping holding the lower surface of the flash.

7. The method for producing a forged crankshaft according to claim 2, wherein
at least one of the rough crank arms has, in a region near an adjacent one of the rough journals, a second excess portion protruding from an outer periphery of a side portion of the rough crank arm; and
during the die forging of the rough forged blank in the finish forging step, the second excess portion is deformed by the first pair of dies to bulge toward the adjacent rough pin.

8. The method for producing a forged crankshaft according to claim 1, wherein
in the finish forging step, the first excess portion is deformed by the first pair of dies to bulge toward the adjacent rough journal while a second die is in contact with a rough-journal-facing surface of the rough crank arm at a portion between the first excess portion and the flash.

9. The method for producing a forged crankshaft according to claim 8, wherein
in the finish forging step, the first excess portion is deformed by the first pair of dies to bulge toward the adjacent rough journal while a holder is holding a lower surface of the flash;
the holder moves along with a movement of the first pair of dies while keeping holding the lower surface of the flash.

10. The method for producing a forged crankshaft according to claim 8, wherein
at least one of the rough crank arms has, in a region near an adjacent one of the rough journals, a second excess portion protruding from an outer periphery of a side portion of the rough crank arm; and
during the die forging of the rough forged blank in the finish forging step, the second excess portion is deformed by the first pair of dies to bulge toward the adjacent rough pin.

11. The method for producing a forged crankshaft according to claim 1, wherein
in the finish forging step, the first excess portion is deformed by the first pair of dies to bulge toward the adjacent rough journal while a holder is holding a lower surface of the flash;
the holder moves along with a movement of the first pair of dies while keeping holding the lower surface of the flash.

12. The method for producing a forged crankshaft according to claim 11, wherein
at least one of the rough crank arms has, in a region near an adjacent one of the rough journals, a second excess portion protruding from an outer periphery of a side portion of the rough crank arm; and
during the die forging of the rough forged blank in the finish forging step, the second excess portion is deformed by the first pair of dies to bulge toward the adjacent rough pin.

13. The method for producing a forged crankshaft according to claim 1, wherein
in the finish forging step, the first excess portion is deformed by crushing or bending.

14. The method for producing a forged crankshaft according to claim 13, wherein
at least one of the rough crank arms has, in a region near an adjacent one of the rough journals, a second excess portion protruding from an outer periphery of a side portion of the rough crank arm; and
during the die forging of the rough forged blank in the finish forging step, the second excess portion is deformed by the first pair of dies to bulge toward the adjacent rough pin.

15. The method for producing a forged crankshaft according to claim 1, wherein
at least one of the rough crank arms has, in a region near an adjacent one of the rough journals, a second excess portion protruding from an outer periphery of a side portion of the rough crank arm; and
during the die forging of the rough forged blank in the finish forging step, the second excess portion is deformed by the first pair of dies to bulge toward the adjacent rough pin.

16. The method for producing a forged crankshaft according to claim 15, wherein
in the finish forging step, the second excess portion is deformed by the first pair of dies to bulge toward the adjacent rough pin while a third die is in contact with a rough-pin-facing surface of the rough crank arm at a portion between the second excess portion and the flash.

17. The method for producing a forged crankshaft according to claim 15, wherein
the rough crank arm has, in the region near the adjacent rough journal, second excess portions respectively protruding from outer peripheries of two side portions of the rough crank arm.

18. The method for producing a forged crankshaft according to claim 15, wherein
the rough crank arm having the second excess portion is the rough crank arm incorporating a rough counterweight.

19. The method for producing a forged crankshaft according to claim 15, wherein
the rough crank arm having the second excess portion is the rough crank arm not incorporating a rough counterweight.

20. The method for producing a forged crankshaft according to claim 15, wherein
in the finish forging step, the second excess portion is deformed by crushing or bending.

* * * * *